United States Patent
Lecoeuvre et al.

(10) Patent No.: US 6,395,989 B2
(45) Date of Patent: May 28, 2002

(54) CROSS-LINKABLE SEMICONDUCTIVE COMPOSITION, AND AN ELECTRIC CABLE HAVING A SEMICONDUCTIVE COATING

(75) Inventors: Jean-François Lecoeuvre; Karine Paty; Bernard Poisson; Patrick Sanchez, all of Paris Cedex (FR)

(73) Assignee: Sagem SA, Paris (FR)

( * ) Notice: Subject to any disclaimer, the term of this patent is extended or adjusted under 35 U.S.C. 154(b) by 0 days.

(21) Appl. No.: 09/855,769

(22) Filed: May 15, 2001

(30) Foreign Application Priority Data

May 19, 2000 (FR) .............................. 00 06478

(51) Int. Cl.$^7$ ................................. H01B 1/24
(52) U.S. Cl. ................................. 174/120 SC
(58) Field of Search ............... 174/102 SC, 106 SC, 174/120 SC; 428/372, 379, 383; 524/495, 496; 252/511

(56) References Cited

U.S. PATENT DOCUMENTS

| | | | |
|---|---|---|---|
| 4,246,142 A | 1/1981 | Ongchin | 252/511 |
| 4,286,023 A | 8/1981 | Ongchin | 428/516 |
| 4,412,938 A * | 11/1983 | Kakizaki et al. | 252/511 |
| 6,080,810 A * | 6/2000 | Ribarits et al. | 524/495 |
| 6,294,256 B1 * | 9/2001 | Easter | 174/106 SC |

FOREIGN PATENT DOCUMENTS

| EP | 0364848 | 4/1990 |
|---|---|---|
| EP | 0962944 | 12/1999 |
| WO | 97/19134 | 5/1997 |

OTHER PUBLICATIONS

Database WPI. Section Ch, Week 198220—Derwent Publications Ltd., London, GB; AN 1982–40684E—XP002156392 & JP 57 0611040 A (Mitsubishi Petrochemical Co., Ltd.), Apr. 13, 1982 Abstract.
Database WPI. Section Ch, Week 198152—Derwent Publications Ltd., London, GB: AN 1981–95567D—XP002156393 & JP 56 145608 A (Hitachi Cable Ltd.), Nov. 12, 1981—Abstract.
Database WPI. Section Ch, Week 197904—Derwent Publications Ltd., London, GB: AN 1979–06613B—XP002156394 & JP 53 141480 A (Hitachi Cable Ltd.) Dec. 9, 1978—Abstract.
Patent Abstracts of Japan—vol. 016, No. 294 5E–1228, Jun. 29, 1992 & JP 04 079105 A (Fujikura Ltd.), Mar. 12, 1992—Abstract.

* cited by examiner

*Primary Examiner*—Chau N. Nguyen
(74) *Attorney, Agent, or Firm*—Larson & Taylor, PLC

(57) ABSTRACT

A cross linkable composition includes a copolymer part being composed of a copolymer of ethylene and an organic acid salt of an alkyl, alkenyl, or alkynyl radical including 26% to 42% by weight of monomer, representing 50% to 90% by weight of the polymer phase; and an acrylonitrile-butadiene copolymer having 25% to 50% by weight acrylonitrile, representing 10% to 50% by weight of the polymer phase. It further has carbon black having a specific surface area of less than 170 m$^2$/g, representing 40% to 75% by weight of the polymer phase and additives such as antioxidants, anti-coppers, peroxides, silanes, in quantities that generally remain below 5% of the polymer phase.

15 Claims, 1 Drawing Sheet

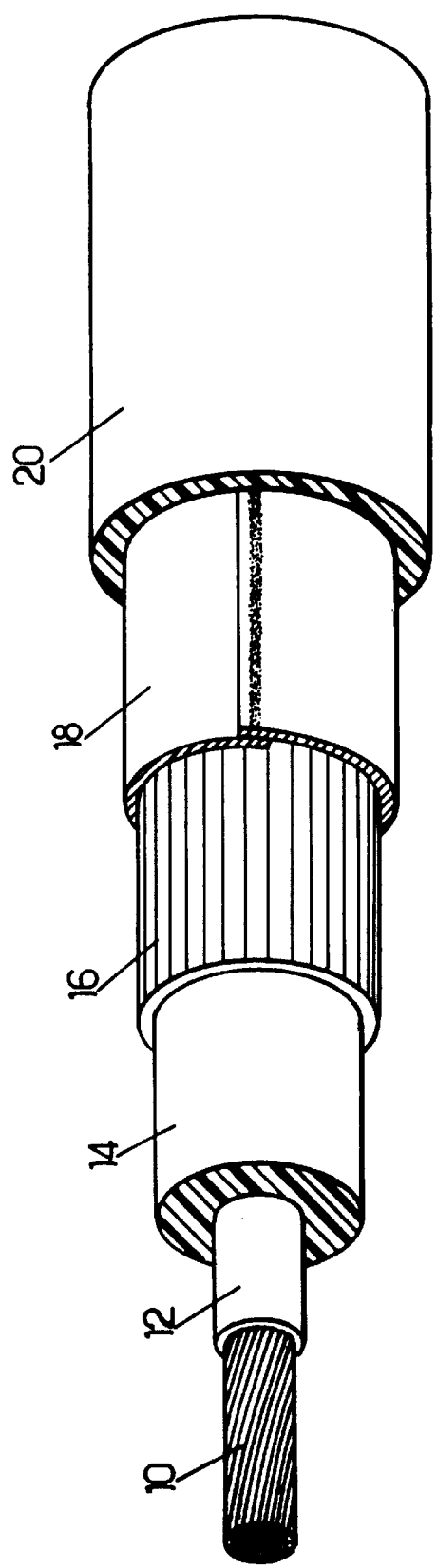

CROSS-LINKABLE SEMICONDUCTIVE COMPOSITION, AND AN ELECTRIC CABLE HAVING A SEMICONDUCTIVE COATING

BACKGROUND OF THE INVENTION

The present invention relates to electric cables, intended in particular for medium voltage and high voltage networks, and required to remain leakproof over long lifetimes.

Single-conductor cables of this type are generally of the structure shown diagrammatically in the accompanying figure. The central conductor 10 is made up of a bundle of wire strands that are often twisted helically and that are generally made of copper or aluminum, and it is coated in a coating 12 of so-called "semiconductive" material intended in particular for smoothing the outside surface of the bundle and consequently for reducing peaks in electric field. A layer 14 of insulating material, generally made of polyethylene or peroxide-cured ethylene-propylene rubber (EPR) covers the assembly constituted by the conductor and the coating. It is in turn generally covered by a second coating of semiconductive material 16 referred to as the "outer" semiconductor. The three layers built up in this way are generally cured (i.e. cross-linked) by peroxide decomposition at high temperature; they can also be cured by the silane method.

The resulting assembly is often referred to as an electrical core and it is protected against moisture which would run the risk of giving rise to electrical treeing or arcing. For this purpose, a conductive tube 18 generally made of aluminum or copper is used that generally has a thickness of one to a few hundred microns ($\mu$m), which tube also constitutes an electric shield. The tube is often constituted by foil or tape that is folded or wound around the insulation with overlapping margins, and by applying adhesive, e.g. using a hot-melt adhesive. The metal tube can also be constituted by an extruded metal, e.g. lead or aluminum. Finally, a mechanical protective sheath 20 of polyethylene or polyvinyl chloride type material that combines good mechanical characteristics with good resistance to cracking and good resistance to thermal aging, is then stuck on the screen. Often a sealing powder is placed on the coating 16 (which then has external fluting) prior to the tube being put into place. Another solution consists in using a smooth coating 16 on which a swelling tape is placed, which tape may be conductive, followed by the metal tube. Wires can also be added if the section of the metal screen is not sufficient to carry short-circuit currents. Combinations of these various components can also be used.

Such cables are used in particular for distribution at medium voltage, i.e. in the range 12 kilovolts (kV) to 20 kV.

In numerous applications, it is desirable to make the semiconductive coating peelable, i.e. separable from the insulation on which it is to be found by applying a small amount of force, generally less than 25 Newtons per centimeter (N/cm) at a temperature of 20° C. The use of such an outer semiconductor makes it easier to prepare the ends of a cable for splicing or termination purposes.

Various compositions are already in use for making such outer semiconductors. In particular, the following composition is used:

ethylene vinyl acetate copolymer (EVA) having a vinyl acetate content in the range 40% to 45%, such a polymer serving to absorb carbon black by means of its acetate groups and limiting adhesion on the layer 14 of insulating material;

synthetic acrylonitrile butadiene rubber, known as NBR, whose function is to reduce the force of adhesion on the layer of insulating material to the desired value which generally lies in the range 5 N/cm to 25 N/cm at 20° C.; and conductive carbon black, whose content generally lies in the range 40% to 60% of the elastomer content.

The composition often also includes lubricants, antioxidants, and a curing agent for cross-linking the copolymers, which agent can be constituted by peroxides.

The above composition gives good technical results. However its cost is high because it uses EVA having 40% to 45% vinyl acetate, which is not widely available and which is expensive. This type of EVA copolymer can be obtained only by a manufacturing method that is complex, making use of polymerization in solution.

SUMMARY OF THE INVENTION

Consequently, it is an object of the present invention to provide a vulcanizable semiconductive composition presenting electrical, mechanical, aging, and adhesion characteristics that are comparable to those of the best compositions known in the past, but using a copolymer whose monomer content is less than 40%, thus enabling it to be fabricated by a high pressure method, similar to that used for polyethylene, and thus more widely available and of much lower cost.

Conductive compositions, e.g. using ethylene and vinyl acetate copolymers with EVA contents of less than 40% have already been described, e.g. in document EP 0 420 271 B1, but those formulations are rather constricting, in particular having an EVA copolymer content greater than 40%, with limits on the specific surface area of the carbon black, which must lie in the range 30 square meters per gram ($m^2/g$) to 60 $m^2/g$, and an additive content (i.e. of plasticizers, lubricant, inert fillers, antioxidant, anti-UV) which must be less than 3%.

The proposed formulas are not suitable for achieving peeling forces of less than 40 N/cm, whereas it is desirable to achieve forces of less than 40 N/cm and preferably lying in the range 5 N/cm to 25 N/cm in order to make it easy to prepare cable splices and terminations.

For this purpose, there is provided in particular a cross-linkable composition comprising:

a mass of copolymer constituted by:
  a copolymer of ethylene and an organic acid salt of an alkyl, alkenyl, or alkynyl radical comprising 26% to 42% of weight of monomer, representing 50% to 90% by weight of the polymer phase; and
  an acrylonitrile and butadiene copolymer known as NBR having 25% to 50% by weight acrylonitrile, representing 10% to 50% by weight of the polymer phase;

carbon black having a specific surface area of less than 170 $m^2/g$, typically representing 40% to 75% by weight of the polymer phase.

Typically there will be additives such as antioxidants, anti-coppers, peroxides, silanes, in quantities that generally remain below 5% of the polymer phase.

Optionally, the composition has one or more of:

at least one aliphatic, aromatic, or naphthenic plasticizer whose content by weight is advantageously less than 20% of the polymer phase;

lubricants capable of belonging to the stearate, oleate, amide, polyethylene wax, or silicone families, at a content generally less than 10% of the polymer phase; and inert mineral fillers (chalk, kaolin, alumina, talc, silica) at a content that is generally less than 50% of the polymer phase.

The copolymer can, in particular, be one of the following which have been found to be particularly advantageous:

EVA: ethylene vinyl acetate which has been found to be particularly advantageous;

EBA: ethylene butyl acrylate;

EMA: ethylene methyl acrylate; and

EEA: ethylene ethyl acrylate.

In practice, the alkyls used are generally lower alkyls (having up to five carbon atoms).

In terms directly of weight, formulations of the invention will generally have the following composition:

25% to 40% EVA (ethylene vinyl acetate) copolymers, as described above;

7% to 25% NBR (acrylonitrile butadiene rubber) copolymers, as described above;

19% to 40% carbon black presenting a specific surface area of less than 170 $m^2/g$, as measured using the standard ASTM D 4820; and 0.4% to 3% additives such as peroxides and antioxidants.

The following can be added thereto:

0 to 25% inert filler (chalk, kaolin, talc, silica, alumina, etc.);

0 to 20% aliphatic, aromatic, or naphthenic plasticizer; and 0 to 10% lubricants.

A marked advantage of formulations of the invention is that they use copolymers that are widely available and less expensive.

The particular semiconductive formulation that is selected will, technically speaking, typically be a compromise between characteristics enabling it to be used on an industrial scale. Frequently, the term "conductive" will be use rather than "semi-conductive" for short and also to avoid confusion with materials designated as semi-conductors in the elctronic industry.

This compromise will take account of the following in particular:

ease with which the material can be worked, expressed both in terms of viscosity which must be low enough to prevent the material self-heating during extrusion, and in terms of roasting time which must be long enough to avoid any chance of the cross-linking reaction starting within the extrusion tooling;

reactivity, which expresses the reaction rate of the material in the cross-linking process;

resistivity which must be low enough to ensure that the extruded layer performs its function as a conductive screen effectively;

mechanical characteristics which must be sufficient to enable the material to be peelable without tearing or breaking;

peelability, which must lie between upper and lower limits so that the conductive layer can be separated easily from the insulation but without any risk of unwanted separation occurring between the insulation and the conductive layer, which would harm the electrical function of the cable. Peelability lying in the range 5 N/cm to 25 N/cm at 20° C., as measured by peeling through 180° between the insulation and the conductive layer in application of standard NFC 33223 enables cables to be prepared easily without harming their electrical properties; and the surface appearance of the insulation after the conductive layer has been peeled off, which appearance must be sufficiently smooth and should not present any traces of the conductive composition since that would harm the electrical quality of a connection or termination.

Often a carbon black content lying in the range 27% to 35% and/or having a specific surface area lying in the range 30 $m^2/g$ to 80 $m^2/g$ will give the best results. The ethylene copolymer content will frequently lie in the range 30% to 35% of the total composition.

The invention also provides a method of manufacturing an insulated cable in which a triple head is used to coat a solid or cabled electrical conductor simultaneously with an inner semiconductor, insulation, and an outer semiconductive layer having a composition of the type defined above, and all three layers are cross-linked immediately after extrusion by passing the coated conductor through a heated tube under gas pressure.

The peroxide and the antioxidant required for cross-linking the insulation, e.g. based on polyethylene, can be injected in liquid form at the time of extrusion. In particular, the peroxide can be dicumyl peroxide, butylcumyl peroxide, or ditertiobutyl peroxide. The peroxide for cross-linking the semi-conductive layer can be injected into the extruder at the time the cable is made. This provides an electric cable having a central conductor coated in a coating of semiconductive material, a layer of insulating material, an outer layer of semiconductive material in accordance with the invention, a metal screen made of wires or tapes, and an outer protective sheath. The cable is suitable for being assembled in the form of a bundle of three conductors, possibly together with a carrier.

The above characteristics and others will also appear on reading the following description of comparative examples making it easier to understand the advantages of composition of the invention.

BRIEF DESCRIPTION OF THE DRAWING

The description refers to the sole accompanying FIGURE, already mentioned, which is a sketch of a standard cable structure.

DETAILED DESCRIPTION

The examples below show up the advantages of compositions of the invention.

EXAMPLE 1

Reference

The following formulation is representative of peelable semiconductors used commonly at present on 12/20 kV cables of the NFC 33223 type:

| | |
|---|---|
| EVA rubber (40% VA) | 77 |
| NBR rubber (33% ACN) | 23 |
| Chalk | 10 |
| P type conductive carbon black (140 $m^2/g$) | 60 |
| Plasticizer | 5 |
| Zinc stearate | 3 |
| Antioxidant | 2 |
| 40% peroxide | 2 |

Such formulations are fabricated using known methods, e.g. with internal mixers of the Banbury type, or continuous mixers of the BUSS type.

Conditions and parameters for fabrication are adapted so as to guarantee that the fillers are well dispersed, in particular the carbon black.

Once a homogeneous mixture has been obtained, the formulation is hot or cold granulated and then stored in containers.

Thereafter, the granules are used to feed a line for fabricating a cable and fitted with a group of three extruders for simultaneously covering the conductor of a 12/20 kV cable with three layers (inner semiconductor, insulation, peelable outer semiconductor).

The line is also provided with a continuous vulcanization tube which applies particular conditions of pressure and temperature for causing all three layers of material to cross-link simultaneously.

With a formulation and methods of the kind described above, the semiconductive layer has the following characteristics:

| | |
|---|---|
| Ultimate tensile strength (UTS in MBa) | 13.4 |
| Breaking elongation (BE in %) | 350 |
| Resistivity at 20° C. (ohm-cm) | 890 |
| Resistivity at 90° C. (ohm-cm) | 430 |
| Peelability on XLPE at 20° C. (N/cm) | 11.1 |
| Peelability on XLPE at 40° C. (N/cm) | 99 |

Test conditions for the various characteristics are those set out in NFC 33223. It can be seen that formulations of the kind presently in use have good mechanical, electrical, and peelability characteristics.

EXAMPLE 2

This example serves to compare the characteristics of formulations known to the person skilled in the art with those of the invention.

The samples necessary for the various tests were obtained by coextrusion on a group of two laboratory extruders:

firstly a PE-based cross-linkable insulator containing polyethylene with radicals having MFR 2 g/10 minutes as measured using ISO standard 1133 (190° C., 21.6 N), a liquid peroxide injected during extrusion (ditertio butyl peroxide), and an antioxidant of the phenolic type; and secondly each of the test formulae.

The test pieces were in the form of solid aluminum conductors having a diameter of about 10 millimeters (mm), covered by 3 mm of insulation, and about 1 mm of semiconductive layer; once they have been made, the test pieces were placed in a tube containing steam superheated to 200° C., and they were then allowed to rest for 24 hours (h) to 48 h before tests were performed.

| | Reference | 1 | 2 | 3 |
|---|---|---|---|---|
| EVA rubber (40% VA) | 73 | | | |
| Elvax 350 (25% VA) | | 70 | | |
| Elvax 150 (33% VA) | | | 70 | |
| Evatane 3325 (33% VA) | | | 70 | |
| NBR rubber (33% ACN) | 22 | 30 | 30 | 30 |
| Chalk | 10 | 27 | 27 | 27 |

-continued

| | Reference | 1 | 2 | 3 |
|---|---|---|---|---|
| P type conductive carbon black ($140\ m^2/g$) | 60 | 56 | 56 | 56 |
| Aliphatic plasticizer | 5 | | | |
| Aromatic plasticizer | | 6 | 6 | 6 |
| Zinc stearate | 3 | 3 | 3 | 3 |
| PE wax | | 4 | 4 | 4 |
| Antioxidant | 2 | 2 | 2 | 2 |
| Peroxide at 40% | 3 | 2 | 2 | 2 |
| Ultimate tensile strength (MPa) | 13.4 | 14.4 | 10.1 | 14.6 |
| Breaking elongation (%) | 350 | 280 | 367 | 408 |
| Resistivity at 200° C. (ohm-cm) | 890 | 74 | 74 | 29 |
| Resistivity at 300° C. (ohm-cm) | 429 | 226 | 134 | 78 |
| Peelability ar 20° C. (N/cm) | 11.1 | 48.4 | 29.5 | 26 |
| Peelability at 30° C. (N/Cm) | 9.9 | 44 | — | 31 |

This comparison shows that compared with the reference formulation, formulation 1 which uses EVA with 25% vinyl acetate does not make it easy to separate the semiconductive layer from the insulation.

On the other hand, formulations 2 and 3 which are made in accordance with the invention come very close to being a materials that are suitable for use on an industrial scale, and this applies in particular to composition No. 3.

Compared with reference formulation, compositions 2 and 3 are particularly different due to:

the use of an EVA copolymer having 33% VA;

a reduction in the EVA copolymer content in the composition;

the use of an aromatic plasticizer; this plasticizer can be selected from known plasticizers, for example Exarol 25 from Total, or Shellflex 729C from Shell, or an alkyl naphthenic oligomer plasticizer;

the antioxidant is advantageously of the trimethyl dihydroquinoline (TMQ) type; other amine type stabilizers (e.g. Vulkanox DDA from Bayer) or phenolic type stabilizers such as Irganox 1010, Irganox 1076, or Irganox 1035 from Ciba-Geigy, can be used, as can stabilizers such as Santonox R.

An advantage of formulations of the invention also lies in a significant drop in resistivity; this constitutes an advantageous improvement provided by using EVAs having less than 40% VA.

EXAMPLE 3

This example uses a formulation close to formulation 3 and shows how it is possible to further reduce the peeling force by acting on the nature of the carbon black, and in particular by acting on its specific surface area. Apart from the reference, the samples were prepared in the same manner as in Example 2.

| | Reference | 4 | 5 | 6 |
|---|---|---|---|---|
| Type of polymer | EVA 40% | Evatane 3325 | Evatane 3325 | Evatane 332 |
| Type of black | conductive black $140\ m^2/g$ | BP 3615 $60\ m^2/g$ | BP 3515 | BP 3515 |
| Black content (per) | 68 | 60 | 56 | 60 |
| Mooney viscosity at 140° C. | 26.3 | 14.9 | 20 | 24.7 |
| Roasting time at 140° C. Rheometric | 22.9 | >500 | >500 | >500 |

-continued

|  | Reference | 4 | 5 | 6 |
|---|---|---|---|---|
| characteristics: |  |  |  |  |
| ML | 1.29 | 0.76 | 1.05 | 1.35 |
| MHL | 4.02 | 3.03 | 3.85 | 4.46 |
| t90% | 1.02 | 1.08 | 1.08 | 1.08 |
| UTS (MPa) | 13.4 | 13.6 | 13.2 | 12 |
| Peelability at 20° C. | 11.1 | 24.5 | 22.6 | 20.5 |
| Peelability at 40° C. | 9.9 | 18.3 | 17.2 | 16.8 |

This series of tests leads to the following observations:

Compared with present formulations, preparations of the invention lead to low viscosity which is a considerable advantage in working. This smaller viscosity is accompanied by greater safety since the roasting time becomes long. Nevertheless, rheometric characteristics, and in particular the time t90% required to reach 90% vulcanization shows that the cross-linking speed of the material is conserved.

As in the preceding example, the resistivity of the material is still very low, even if the carbon black content is reduced.

The peelability, in particular of formulation 6, is highly acceptable, and satisfies the desired target of 25 N/cm, even at 40° C., thus guaranteeing easy preparation of cable ends and splices.

EXAMPLE 4

This example is for showing how a formulation close to composition No. 6 and containing EVA, a carbon black, and an inert filler content in accordance with the invention can have its peelability force varied by adjusting the EVA/NBR ratio.

Samples were prepared in the same manner as in Example 2.

|  | 7 | 8 | 9 |
|---|---|---|---|
| Evatane 3325 | 70 | 63 | 63 |
| Krynac 3450 | 30 | 37 | 37 |
| Chalk | 27 | 27 | 27 |
| Black BP 3515 | 65 | 65 |  |
| Black CSX 606 (68 m$^2$/g) |  |  | 68 |
| Aromatic plasticizer | 6 | 6 | 6 |
| Zinc stearate | 3 | 3 | 3 |
| PE wax | 4 | 4 | 4 |
| Stabilizer | 2 | 2 | 2 |
| 40% peroxide | 2 | 2 | 2 |
| UTS (MPa) | 10.1 | 11 | 11 |
| BE (%) | 360 | 336 | 346 |
| Variation in BE up to 14 days at 100° C. | 17 | 19 |  |
| Variation in BE up to 42 days at 100° C. | 28 | 29 |  |
| Resistivity at 20° C. (ohm-cm) | 33 | 41 | 38 |
| Resistivity at 90° C. (ohm-cm) | 142 | 113 | 66 |
| Peelability at 20° C. (N/cm) | 16.8 | 11.1 | 20.5 |
| Peelability at 40° C. (N/cm) | 13 | 8.5 | 17.2 |
| Peelability at 20° C. after 14 days at 100° C. | 12.7 | 10.1 |  |
| Peelability at 20° C. after 42 days at 100° C. | 13.8 | 9.4 |  |

It can be seen from this series of formulations that by varying the black content (compare formulations 6 and 7) and by varying the EVA/NBR ratio (compare formulations 7 and 8), it is possible to bring the peelability of the semiconductive layers to values that are comparable to those of the prior art, while guaranteeing good conservation of the characteristics after aging.

As described above, these formulations also present greater security while working, good reactivity, and conductivity that is particularly low.

It can also be seen that these formulations conserve their mechanical and peelability characteristics, even after aging for 42 days at 100° C.

Formulation 9 which contains CSX 606 carbon black from Cabot with a specific surface area that is slightly greater (68 m$^2$/g) also presents a compromise between characteristics that is entirely acceptable.

EXAMPLE 5

This example is intended to show how it is possible using the same semiconductive formulation of the invention to modulate the force of adhesion between the semiconductive layer and the insulation by appropriately selecting the peroxide used for cross-linking. In the tests below, the insulation was made up successively of polyethylene having MFR=2 g/10 min, measured using ISO standard 1133 at 190° C., and 21.6 N, a phenolic type antioxidant, and a working peroxide injected in liquid form simultaneously with the granules of elastomer and carbon black mixture, selected from the following compounds:

ditertio butyl peroxide (DTBP);

terbutyl cumyl peroxide (TBCP);

dicumyl peroxide (DCP).

The quantities of peroxide were those that are commonly used in insulation of this type, i.e. 1.5% to 2% of the quantity of polyethylene.

|  | Insulation with DTBP | Insulation with TBCP | Insulation with DCP |
|---|---|---|---|
| EVA (33% VA) | 63 | 63 | 63 |
| NBR (33% ACN) | 37 | 37 | 37 |
| CSX 606 (68 m$^2$/g) | 63 | 68 | 68 |
| Chalk | 27 | 27 | 27 |
| Aromatic plasticizer | 6 | 6 | 6 |
| Zinc stearate | 3 | 3 | 3 |
| PE wax | 4 | 4 | 4 |
| Antioxidant | 2 | 2 | 2 |
| 40% peroxide | 1.2 | 1.2 | 1.2 |
| UTS (MPa) | 10.6 | 11.4 | 10.3 |
| BE (%) | 346 | 345 | 347 |
| Resistivity at 20° C. | 14 | 35 | 22 |
| Resistivity at 90° C. | 72 | 113 | 101 |
| Peelability at 20° C. (N/cm) | 15.8 | 11.1 | 9.4 |
| Peelability at 40° C. (N/cm) | 14.2 | 10.2 | 7.1 |

This table of results shows that by lowering the decomposition temperature of the peroxide of the insulation, it is possible with conductive formulations of the invention to modulate the peeling force between the insulation and the conductive layer, thereby achieving separation forces that make it easy to prepare cable terminations and splices.

EXAMPLE 6

A 150 mm$^2$ 12/20 kV cable was made industrially in compliance with the description of standard NFC 33223. The insulation was constituted by polyethylene having MRF of 2.1 at 190° C. under 21.6 N (measured using ISO standard 1133), in which there was injected at the time of extrusion a solution containing DTBP type liquid peroxide.

The outer semiconductor corresponded to formulation 8 in Example 4. The cable was made on a short chain type insulating line having a group of three triple-head extruders.

The characteristics of the peelable conductive layer were as follows:

| | |
|---|---|
| UTS (MPa) | 14.3 |
| BE (%) | 239 |
| Resistivity (ohm-cm) at 20° C. | 90 |
| Resistivity (ohm-cm) at 90° C. | 224 |
| Peelability (N/cm) at 20° C. | 18.3 |
| Peelability (N/cm) at 40° C. | 13 |

The characteristics obtained are satisfactory; in addition, compared with prior art cables, it can be seen that there is a significant improvement in the state of the interface between the insulation and the semiconductor, in particular with fewer microtraces of tearing when the peelable semiconductor is peeled off the surface of the insulation.

More generally, using a method of fabricating an insulated cable, it is possible to cause a conductor to pass in succession:

through a multiple extruder head connected to three extruders enabling a semiconductive composition for forming an inner coating, an insulating composition, and a composition of the above kind for forming a peelable outer semiconductive coating to be injected simultaneously; and through a tube for applying gas pressure and heat.

What is claimed is:

1. A cross-linkable composition comprising, by weight of the full composition:

25% to 40% of a copolymer of ethylene and an organic acid salt of an alkyl, alkenyl, or alkynyl radical comprising 26% to 42% by weight of monomer, representing 50% to 90% by weight of the polymer phase; and an acrylonitrile-butadiene copolymer having 25% to 50% by weight acrylonitrile, representing 10% to 50% by weight of the polymer phase;

19 to 40% of carbon black having a specific surface area of less than 170 m$^2$/g, representing 40% to 75% by weight of the polymer phase;

0.4 to 3% of additives.

2. A composition according to claim 1, wherein the ethylene copolymer is at least one copolymer selected from the group consisting of EVA, EBA, EMA and EEA.

3. A composition according to claim 1, further comprising from 0 to 20% wt of a aliphatic, aromatic, or naphthenic plasticizer.

4. A composition according to claim 1, further comprising from 0 to 10% wt of a lubricant selected from the group consisting of stearates, oleates, amides, polyethylene wax, or silicone.

5. A composition according to claim 1, further comprising from 0 to 25% wt of inert mineral fillers selected from the group consisting of chalk, kaolin, alumina, talc and silica.

6. A composition according to claim 1, wherein the carbon black content is in the range 27% to 33%.

7. A composition according to claim 1, wherein the carbon black has a specific surface area in the range 30 m$^2$/g to 80 m$^2$/g.

8. A composition according to claim 1, wherein the ethylene copolymer content is in the range 30% to 35% of the total composition.

9. Electric cable comprising:
   a central electric conductor,
   an inner layer of semiconductor material on said central electric conductor,
   a layer of electrically insulating material on said inner layer,
   an outer layer of semiconductor material on said layer of electrically insulating material,
   a metal shield constituted by wires or tapes on said outer layer, and
   an external protection sheath,
   wherein said outer layer is obtaiined from a composition according to claim 1.

10. Electric cable according to claim 9, wherein a force for removing to be exerted on said outer layer of semiconductor material is lower than 25 N /cm at 20° C.

11. A cross-linkable composition comprising,
    a mass of polymer constituted by:
    a copolymer of ethylene and an organic acid salt of an alkyl, alkenyl, or alkynyl radical comprising 26% to 42% by weight of monomer, representing 50% to 90% by weight of the polymer phase; and
    an acrylonitrile-butadiene copolymer having 25% to 50% by weight acrylonitrile, representing 10% to 50% by weight of the polymer phase; and
    carbon black having a specific surface area of less than 170 m$^2$/g, representing 40% to 75% by weight of the polymer phase.

12. A method of manufacturing an insulated cable, comprising the steps of:
    (a) preparing a cross-linkable composition comprising, by weight of the full composition:
       25% to 40% of a copolymer of ethylene and an organic acid salt of an alkyl, alkenyl, or alkynyl radical comprising 26% to 42% by weight of monomer, representing 50% to 90% by weight of the polymer phase; and
       an acrylonitrile-butadiene copolymer having 25% to 50% by weight acrylonitrile, representing 10% to 50% by weight of the polymer phase;
       19 to 40% of carbon black having a specific surface area of less than 170 m$^2$/g, representing 40% to 75% by weight of the polymer phase;
       0.4 to 3% of additives,
    (b) coating a solid or cabled electrical conductor simultaneously with a multiple head connected to three extruders for simultaneous injection of an inner semiconductive layer, an insulation, and an outer semiconductive layer having said composition; and
    (c) simultaneouslmy crosslinking all said three layers immediately after extrusion by passing the coated conductor through a heated tube under gas pressure.

13. Method according to claim 12, wherein peroxide and antioxidant for cross-linking are injected in liquid phase during extrusion.

14. Method according to claim 13, wherein the peroxide is dicumyl peroxide, butylcumid peroxide, or ditertiobutyl.

15. Method according to claim 12, wherein peroxide for cross-linking is injected into the injector head during cable manufacture.

* * * * *